United States Patent
Steshenko (10) Patent No.: US 9,311,585 B1
(45) Date of Patent: Apr. 12, 2016

(54) MAGNETIC STRIPE DATA EMULATION RATE ADJUSTMENT BASED ON SWIPE SPEED

(71) Applicant: Square, Inc., San Francisco, CA (US)

(72) Inventor: Rodion T. S. V. Steshenko, Oakland, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/478,601

(22) Filed: Sep. 5, 2014

(51) Int. Cl.
*G06K 19/06* (2006.01)
*G06K 19/07* (2006.01)

(52) U.S. Cl.
CPC ...... *G06K 19/06206* (2013.01); *G06K 19/0716* (2013.01)

(58) Field of Classification Search
CPC .............. G06K 19/06206; G06K 19/0716
See application file for complete search history.

(56) References Cited

U.S. PATENT DOCUMENTS 8,317,103 B1 * 11/2012 Foo .................. G06K 19/06187
235/449
8,590,796 B1    11/2013 Cloutier et al.
2009/0159667 A1  6/2009 Mullen et al.
2011/0174874 A1  7/2011 Poznansky et al.

OTHER PUBLICATIONS

U.S. Appl. No. 14/478,522, of Lamba, K., filed Sep. 5, 2014.
Non-Final Office Action mailed Feb. 6, 2015, for U.S. Appl. No. 14/478,522, of Lamba, K., filed Sep. 5, 2014.
Notice of Allowance mailed Jun. 3, 2015, for U.S. Appl. No. 14/478,522, of Lamba, K., filed Sep. 5, 2014.

\* cited by examiner

*Primary Examiner* — Kristy A Haupt
(74) *Attorney, Agent, or Firm* — Perkins Coie LLP (57) ABSTRACT

A proxy card comprising a swipe speed sensor that detects the speed at which the proxy card is traveling through a magnetic card reader and a microcontroller that uses the swipe speed to adjust a rate at which magnetic stripe data stored in a memory on the proxy card is transmitted to a magnetic stripe emulator on the proxy card is disclosed. The magnetic stripe emulator emulates the magnetic stripe data by generating a magnetic field that changes at the rate at which the magnetic stripe data is received from the microcontroller to ensure that the changing magnetic field is readable by a magnetic stripe reader in the time it takes to complete the swipe. The rate at which the magnetic stripe data is transmitted to the magnetic stripe emulator can be a predetermined multiple of the swipe speed of the proxy card.

18 Claims, 8 Drawing Sheets

MAGNETIC STRIPE DATA EMULATION RATE ADJUSTMENT BASED ON SWIPE SPEED

BACKGROUND

A proxy payment card (hereinafter simply "proxy card") is a physical card, similar in appearance to a traditional magnetic stripe payment card (e.g., a credit card, debit card or pre-paid card) and readable by a traditional magnetic card reader, but it can emulate one or more other payment cards. For example, a proxy card of a particular cardholder may be configurable to emulate either the cardholder's Visa card or MasterCard for any purchase from any given merchant, according to the cardholder's choice at the time of purchase. A proxy card may include electronics, an emulator coil, and other components to store multiple sets of magnetic stripe data, for example, card data for two or more payment cards, and can emulate any one of the sets of stored magnetic stripe data. When such a proxy card is swiped through a magnetic read head of a magnetic stripe card reader, a microcontroller on the proxy card "plays back" a set of magnetic stripe data sequentially to an emulator coil on the proxy card. The play back causes the emulator coil to produce a magnetic field. The changing magnetic field induces a read signal in the magnetic read head coil. The read signal is then decoded by the magnetic read head to obtain the magnetic stripe data.

The above described play back method to emulate magnetic stripe data depends on the speed at which a proxy card is swiped and can lead to decoding error. For example, if a user swipes a proxy card at a swipe speed faster than the rate of play back, the magnetic card reader may not be able to obtain a full read signal. Consequently, the user may have to swipe the proxy card more than once before the magnetic read head can obtain a successful read. That wastes both the cardholder's and the merchant's time and causes annoyance to both of them.

BRIEF DESCRIPTION OF THE DRAWINGS

One or more embodiments of the present disclosure are illustrated, by way of example and not limitation, in the figures of the accompanying drawings in which like references indicate similar elements.

DETAILED DESCRIPTION

The present disclosure is related to a proxy payment card ("proxy card") capable of adjusting the rate at which magnetic stripe data associated with a payment card is emulated. Embodiments of a proxy card disclosed herein overcome the disadvantages of the existing proxy cards by providing a magnetic stripe emulator that can emulate magnetic stripe data at a rate that is based on a speed at which the proxy card is swiped through a magnetic card reader ("swipe speed"). For example, when a swipe speed is slow, a magnetic stripe emulator emulates magnetic stripe data at a lower rate compared to when the swipe speed is fast. By emulating the magnetic stripe data at a rate that is a function of a swipe speed, the proxy card ensures that the emulated signal is fast enough to allow all of the magnetic stripe data to be emulated within the time it takes to complete the swipe, and slow enough to allow a magnetic stripe reader to read and decode the emulated signal with an acceptably low likelihood of error. Because of the complete emulation and the low likelihood of error, a user normally will not need to swipe the proxy card more than once for the magnetic card reader to successfully read the emulated signal.

A proxy card disclosed herein includes a swipe speed sensor that detects a swipe speed and a microcontroller that adjusts or controls, based on the swipe speed, a rate at which magnetic stripe data is transmitted to a magnetic stripe emulator on the proxy card. The magnetic stripe emulator then emulates the magnetic stripe data by generating a signal in the form of a changing magnetic field. The signal from the magnetic stripe emulator is read by a magnetic stripe reader during the swipe. The rate at which the magnetic stripe data is transmitted to the magnetic stripe emulator is based on a predetermined multiple of the swipe speed of the proxy card. For example, in some embodiments, the rate is proportional to the swipe speed of the proxy card multiplied by a factor of two. By controlling the rate in such a manner, a likelihood of the magnetic stripe reader capturing at least one complete emulated signal in the time it takes for the proxy card to travel from one end of a read head of the magnetic stripe reader to the other is increased. Another advantage of controlling the rate is that the time between peaks in the emulated signal can be increased, which increases a likelihood of error free decoding of the emulated signal by the magnetic stripe reader.

Some embodiments of the proxy card disclosed herein further include a start sensor that detects a start of a swipe of the proxy card and triggers a swipe speed sensor to measure a swipe speed of the proxy card and a microcontroller to adjust or control, based on the swipe speed, a rate at which magnetic stripe data is played back to a magnetic stripe emulator on the proxy card. In such embodiments, as the timing of the start of the emulation is made to coincide with the start of the swipe, the emulated signal need only be as fast as the swipe speed and the emulation normally need only occur once for a magnetic card reader to successfully obtain a read signal from the swipe. This method of timing the start of the emulation and controlling the rate of emulation also provides energy savings as the magnetic stripe data need only be played once instead of repeatedly.

As used herein, a play back speed is a rate at which magnetic stripe data is transmitted by a microcontroller to a magnetic stripe emulator. The terms play back speed and data rate of transmission are used interchangeably in this disclosure. As used herein, an emulated signal is a changing magnetic field encoding magnetic stripe data that is generated by a magnetic stripe emulator. As used herein, an emulation rate is a rate of change of a magnetic field generated by a magnetic stripe emulator.

Various embodiments of a proxy card and a method for controlling a rate of transmission of magnetic stripe data to a magnetic stripe emulator to ensure that a magnetic stripe reader can obtain a successful read of an emulated signal in a single swipe will now be described in greater detail.

Figure 1:
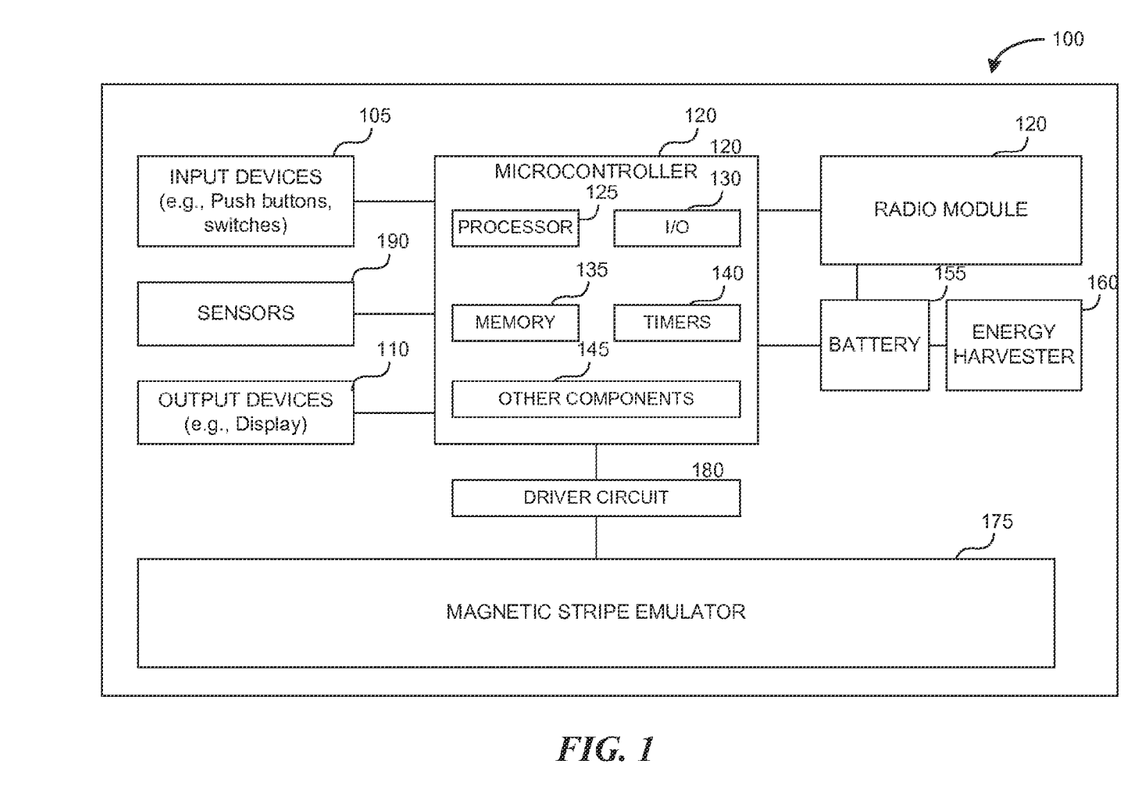
FIG. 1 is a high-level block diagram illustrating example components of a proxy card in accordance with the present disclosure.

FIG. 1 is a high-level block diagram illustrating example components of a proxy card 100 in accordance with the present disclosure. The proxy card 100 includes a magnetic stripe emulator 175 that extends along substantially the entire length of the proxy card 100 and produces magnetic field. The proxy card 100 includes a microcontroller 120 that controls the magnetic stripe emulator 175 via a driver circuit 180. The microcontroller 120 generates and sends electrical signals corresponding to a bit pattern of the magnetic stripe data via the driver circuit 180 to the magnetic stripe emulator 175 to cause the magnetic stripe emulator to produce a changing magnetic field encoding the magnetic stripe data. For example, a data bit "1" from the microcontroller 120 causes the driver circuit 180 to drive current through the emulator coil in one direction, inducing a magnetic field in a direction given by the right hand rule. Similarly, a data bit "0" from the microcontroller induces a magnetic field in an opposite direction. The microcontroller 120 generally includes a processor 125, one or more input/output ports or interfaces 130, a memory 135, timers 140 and other components 145 (e.g., analog to digital converters). The memory 135 stores magnetic stripe data associated with one or more payment cards, for example, credit cards, debit cards, gift cards or pre-paid cards or any data bearing cards (e.g., payment cards, access cards).

The proxy card 100 also includes one or more input devices 105 for selecting a payment card for emulation. The input devices 105 can be or include, for example, push buttons, switches, touch screens and so on. In some embodiments, the proxy card 100 includes a radio module 120 that enables radio communication between the components in the proxy card 100 and other components outside of the proxy card 100. For example, magnetic stripe data associated with a payment card can be loaded into the memory 135 from an external device (e.g., a mobile device such as a smartphone, or a computer system) using the radio module 120. The radio module 120 can support various short range and/or medium range radio communication technologies including, for example, Near-Field Communication (NFC), Bluetooth, Wi-Fi, Zigbee and any other wireless (or wired) communication technologies. The proxy card 100 can also include one or more output devices 100 to display various types of information. For example, information relating to a payment card that is currently being emulated by the magnetic stripe emulator 175 can be displayed on an output display device 110.

The proxy card 100 also includes one or more sensors 190. The one or more sensors can include a swipe speed sensor capable of measuring or detecting the speed of movement of the proxy card 100 through a magnetic card reader. Examples of a sensor 190 can include but is not limited to: an accelerometer, a gyroscope, a capacitive sensor, a magnetic field sensor, a light sensitive sensor, or the like. The sensor 190 can directly or indirectly measure the swipe speed. For example, an accelerometer measures acceleration and outputs voltage that is proportional to the sensed acceleration. In this case, the processor 125 can use an integration technique to integrate acceleration over time to estimate the speed of the proxy card 100. For example, using a discrete integration technique, a new value of a swipe speed at time t can be calculated based on an old value of the swipe speed and an old value of the acceleration using equation (1) or a variation of it.

$$\text{Swipe speed } (t) = \text{swipe speed } (t-1) + \text{sampling period} * \text{acceleration } (t-1) \quad (1)$$

In some embodiments, a sensor 190 can include a capacitive sensor. A capacitive sensor can take many forms. One example form can include a pair of electrodes of length L running parallel to the magnetic stripe emulator. A fixed voltage can be applied across the pair of electrodes. As the proxy card 100 travels through a read head of a magnetic card reader, a portion (x) of the pair of electrodes remains inside the read head and a portion (L−x) of the pair of electrodes remains outside. If the capacitance of the inside portion is $C_i(x)$ and the capacitance of the output portion is $C_o(L-x)$, then the total capacitance C is $C_i(x)+C_o(L-x)$. The relationship between charge and capacitance is given by, $$Q = CV = [C_i(x) + C_o(L-x)]V \quad (2)$$

where Q is the charge, C is the total capacitance and V is the voltage. The derivative of equation (2) is given by, $$dQ/dt = [C_i(dx/dt) - C_o(dx/dt)]V \quad (3)$$

$$I \sim dx/dt \quad (4)$$

Based on equation (4), the current in the capacitive sensor is proportional to the swipe speed. Thus, by measuring an amplitude of the current, the swipe speed can be determined. In some embodiments, the sensor 190 can also be used to detect a start and/or end of a swipe in addition to the swipe speed.

In the illustrated embodiment, all of the electronic components on the proxy card are powered by a battery 155. The battery 155 can be any battery suitable to meet the power requirements of the electronic components on board. By way of example, the battery 155 can be rechargeable thin film battery using lithium ion or another technology. In some embodiments, an energy harvester 160 can be integrated in the proxy card 100 to convert ambient energy (e.g., vibration, radio frequency or other sources of energy) into electrical energy to charge the battery 155.

Figure 2:
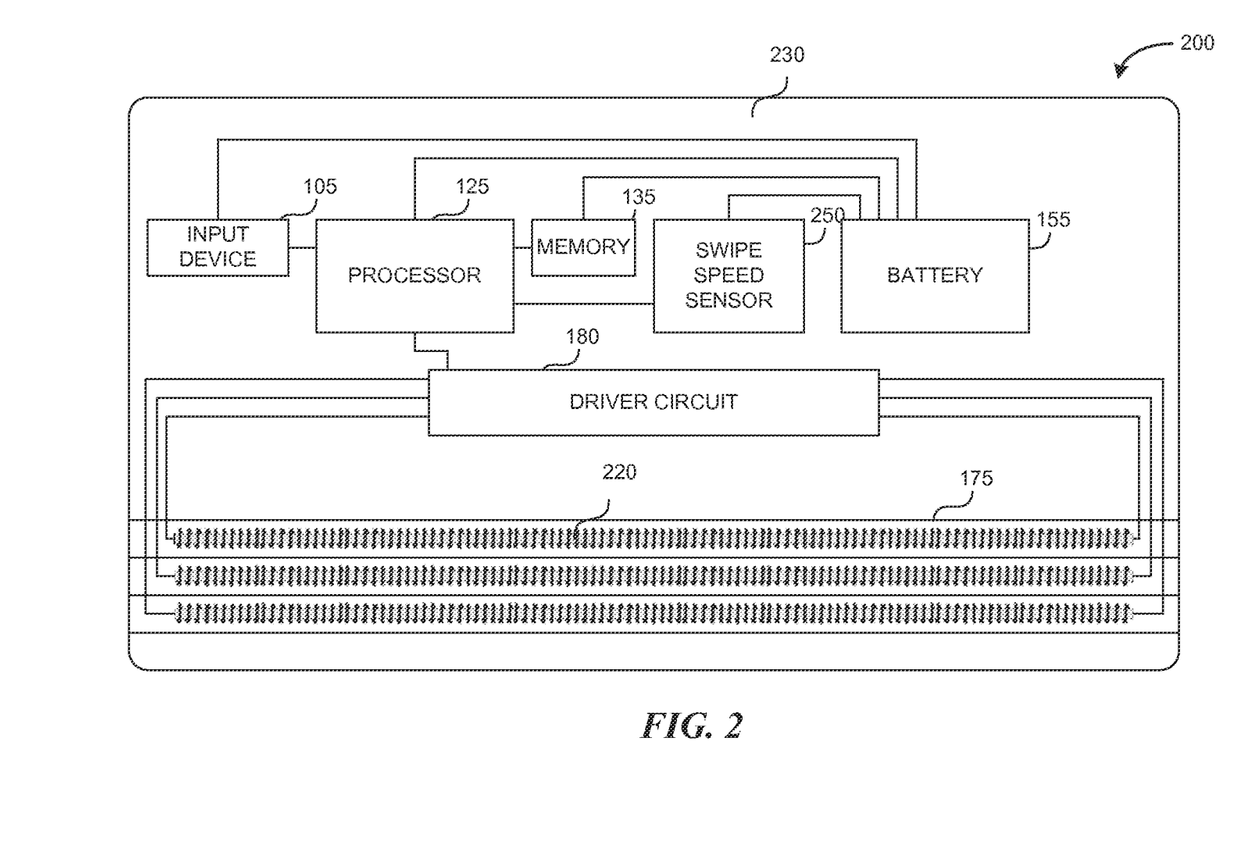
FIG. 2 is a block diagram illustrating a proxy card having a swipe speed sensor in accordance with a first embodiment.

FIG. 2 is a block diagram illustrating a proxy card 200 having a swipe speed sensor 250. The proxy card 200 includes many of the components described with reference to proxy card 100 of FIG. 1. As illustrated, a substrate 230 forms a body of the proxy card 200. The substrate 230 is generally made of nonconductive material and can be a flexible printed circuit board in some embodiments. Various illustrated electronic components can be wholly or partially embedded or surface mounted on the substrate 230. Examples of the electronic components coupled to the substrate 230 include an input device 105, a processor 125 and a memory 135 (e.g., as part of a microcontroller 120), a swipe speed sensor 250, a driver circuit 180, a battery 155 and emulator coils 220. Apart from the magnetic stripe emulator 175, other components in the substrate 230 need not be positioned as depicted in FIG. 2.

As illustrated, the processor 125 is electrically coupled to the input device 105, the memory 135, the swipe speed sensor 250 and the magnetic stripe emulator coils 220 via the driver circuit 180. When a user actuates the input device 105 to select a payment card for the proxy card 200 for emulation, the processor 125 detects the selection of the payment card and in response, retrieves magnetic stripe data corresponding to the selected payment card from the memory 135. The memory 135 and the processor 125 can be components of a microcontroller 120 described with respect to FIG. 1.

The swipe speed sensor 250 detects a speed at which the proxy card 200 travels through a read head of a magnetic card reader. As described with reference to sensors 190 in FIG. 1, the swipe speed sensor 250 can be any suitable sensor that can measure swipe speed or another signal that is proportional to the swipe speed. Depending on the type of sensor, the swipe speed sensor can periodically measure the swipe speed (e.g., at a sampling frequency) or measure the swipe speed once. For example, the swipe speed sensor 250 embodied as an accelerometer can detect swipe speeds at various points in time as the proxy card 200 passes across the read head. Similarly, the swipe speed sensor 250 in the form of a capacitive speed sensor can detect both an average swipe speed measured over a length of the pair of electrodes or any instantaneous swipe speed at a specific point in time. Thus, depending on the type of swipe speed sensor 250, the processor 125 can utilize an instantaneous swipe speed or an average swipe speed to calculate a data rate for emulating the magnetic stripe data.

A calculation of a data rate depends on the size (e.g., number of bits) of the magnetic stripe data. As in a traditional magnetic stripe card, the magnetic stripe emulator can include different regions to emulate different sets of data associated with a payment card. Typically, data including a primary account number (PAN), name and/or other data are emulated on the track 1 region of the magnetic stripe emulator while data including a PAN, an expiration date, and other data are emulated on the track 2 region of the magnetic stripe emulator. In the proxy card 200, the processor 125 sequentially transmits electrical signals corresponding to magnetic stripe data associated with a track region to a corresponding magnetic stripe emulator 175 at a data rate that is calculated based on a data density corresponding to the track region that is to be emulated (e.g., track 1) and a swipe speed. Equation (5) shown below or a variation of it can be used to calculate a data rate.

$$\text{Data Rate} = \text{Data Density} \times N \times \text{swipe speed} \quad (5)$$

where N is any integer or fractional multiplier (e.g., N=1, ½, 2). In some embodiments, N is equal to two, and in that case, the calculated data rate is proportional to two times an average or instantaneous swipe speed.

Figure 6A:
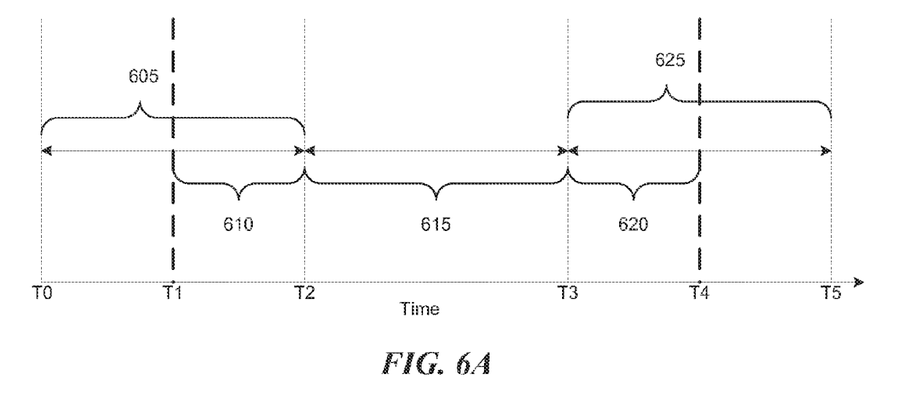
FIG. 6A illustrates a timing relationship between emulated signals and a start and end of a swipe of the proxy card of FIG. 2.

The magnetic stripe emulator receiving the electrical signals generates an emulated signal in the form of a changing magnetic field to be read by a magnetic stripe reader. Because of the data rate being proportional to the swipe speed multiplied a factor of two, the emulated signal can repeat approximately twice in the time it takes for the proxy card to complete the swipe as illustrated in FIG. 6A. In FIG. 6A, an emulation by a proxy card begins at time T0 (e.g., in response to receiving an input) and a swiping of the proxy card begins at time T1. A first emulated signal 605 is generated at time T0 and continues on until time T2. A second emulated signal 615 runs from time T2–T3, while the swipe is in progress and a third emulated signal 625 runs from time T3 until time T5 after the swipe has ended at time T4. In this example, the time taken to complete the swipe (T4–T1) is twice the time period of the emulated signals (T2–T0). As illustrated, a partial signal 610 of the first emulated signal 605, a complete signal 615 and a partial signal 620 of the third emulated signal 625 are presented to a magnetic stripe reader. From these three signals, the complete signal 615 can be decoded to obtain all of the magnetic stripe data emulated by the proxy card.

Figure 3:
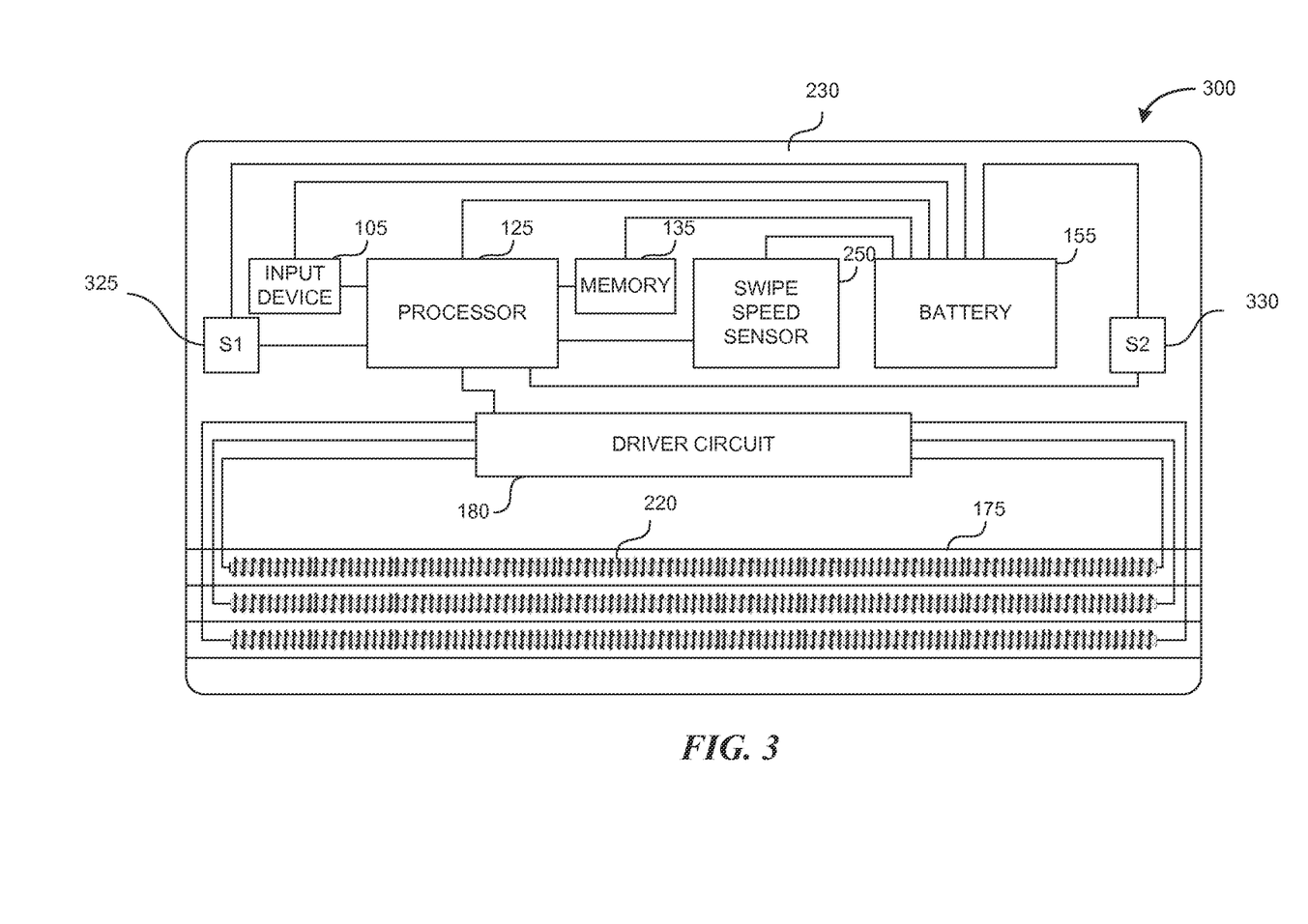
FIG. 3 is a block diagram illustrating a proxy card having a swipe speed sensor and a start sensor in accordance with a second embodiment.

FIG. 3 is a block diagram illustrating a proxy card 300 having a swipe speed sensor 250 and a start sensor 325/330.

Figure 6B:
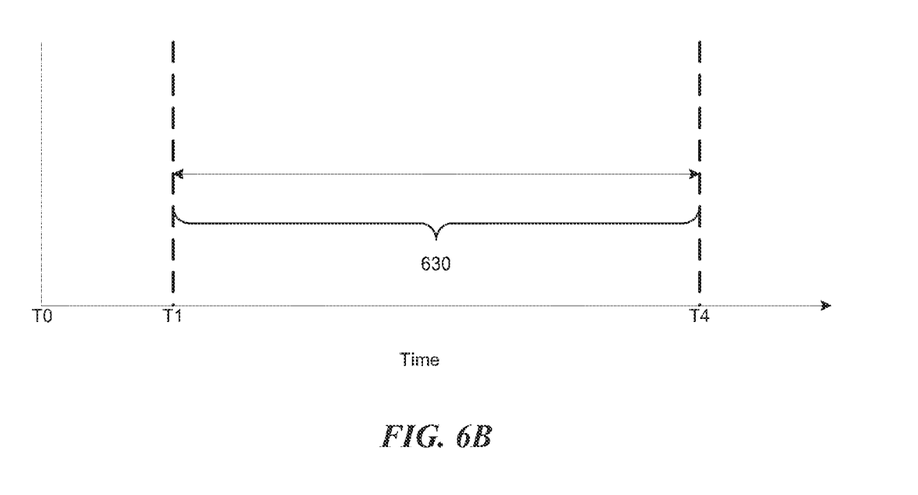
FIG. 6B illustrates a timing relationship between an emulated signal and a start and end of a swipe of the proxy card of FIG. 3.

The proxy card 300 includes all the components of the proxy card 200, and an additional first sensor 325 and in some embodiments a second sensor 330. One of the sensors 325, 330 detects the start of a swipe of the proxy card 300 and can be used to time when to start emulation. In some embodiments, the start and swipe speed sensing can be performed by a same sensor (e.g., swipe speed sensor 250). The sensors 325 and 330 can be located close to the opposite longitudinal edges of the proxy card 300 as depicted in FIG. 3, so that one of the two sensors can detect a position of the proxy card 300 as it enters a magnetic card reader, regardless of the longitudinal direction of the swipe. The sensors 325, 330 can be capacitive, magnetic, light sensitive or other types of sensors. Suppose the first sensor 325 acts as a start sensor. When the start sensor 325 detects the start of a swipe, it triggers the swipe speed sensor 250 to measure the swipe speed of the proxy card 300. The processor 125 obtains the measured swipe speed and then transmits magnetic stripe data of a payment card at a data rate based on the measured swipe speed. In this embodiment, as the start of the emulation begins with the start of the swipe, the data rate can be calculated using equation (5) by setting N=1 to ensure that all of the magnetic stripe data is transmitted to the magnetic stripe emulator within the time it takes a user to complete the swipe. A timing relationship between a signal emulated by the proxy card 300 and a start and end of a swipe is depicted in FIG. 6B. Referring to FIG. 6B, an emulation begins at time T1 at the start of the swipe and the emulation ends at time T4 at the end of the swipe. In this example, the emulated signal runs from time T1 to time T4 approximately to match the swipe speed.

One advantage of playing back the magnetic stripe data to match the swipe speed is that the distance between peaks in the emulated signal is increased. This reduces the error rate in decoding the emulated signal by a magnetic stripe reader. Consequently, the proxy card can normally be swiped once for the magnetic card reader to obtain a correct reading. Another advantage of this embodiment of the proxy card 300 is energy savings. As illustrated by the emulated signal 630 in FIG. 6B, the magnetic stripe data is played back only once, and not repeated in a loop, which results in a reduced power consumption on the proxy card 300. In some embodiments, data can be played back in a loop, with one of the sensors 325, 330 acting as a stop sensor that can detect an end of the swipe and stop the emulation. As noted before, a single sensor (e.g., swipe speed sensor 250) can perform the start, stop and swipe speed sensing in some embodiments.

Figure 4:
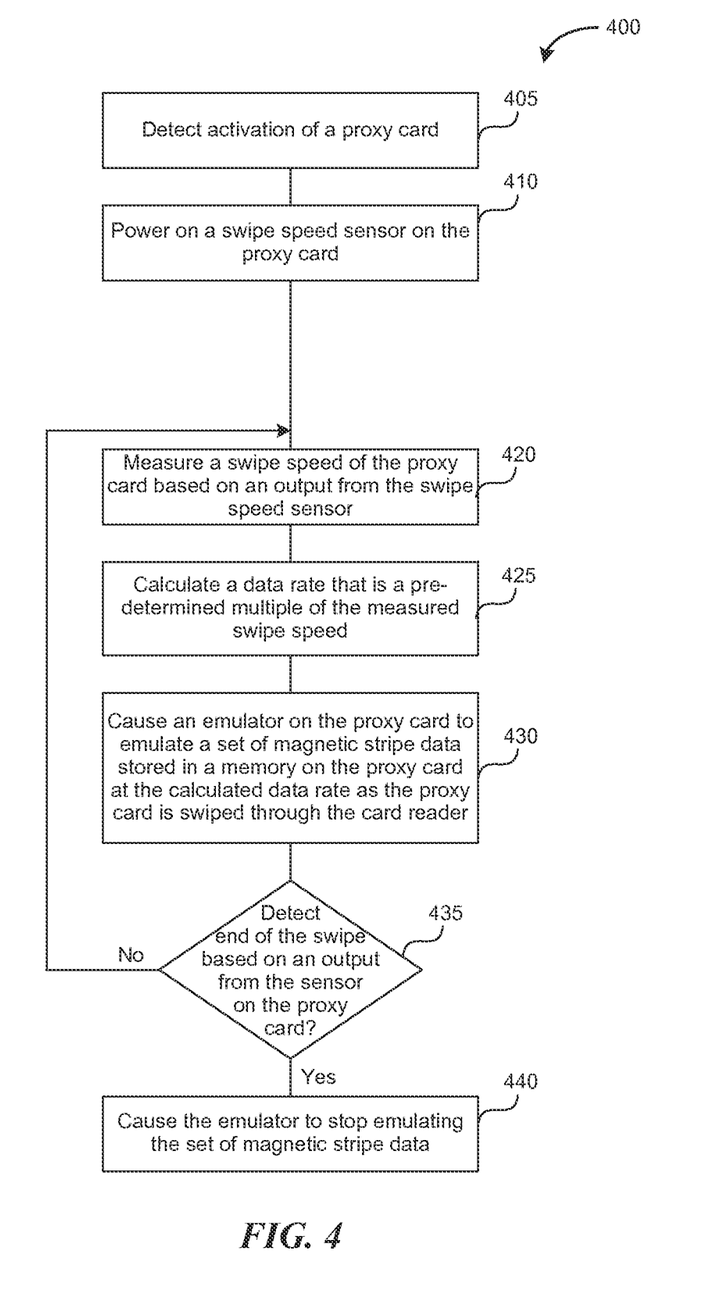
FIG. 4 is a logic flow diagram illustrating an example method for emulating magnetic stripe data at a data rate that is a predetermined multiple of a swipe speed measured by a sensor.

FIG. 4 is a logic flow diagram illustrating an example method 400 for emulating magnetic stripe data at a data rate that is a predetermined multiple of a swipe speed measured by a sensor. At block 405, a processor (or a microcontroller) on a proxy card detects activation of the proxy card. The proxy card can be activated by a user by pressing a power button or a wake up button for example. Electronic components, for example a swipe speed sensor on the proxy card can also be powered on in response to the activation at block 410. At block 420, the processer obtains a swipe speed of the proxy card measured by the swipe speed sensor on the proxy card. The processor then calculates a data rate at which a set of magnetic stripe data stored on a memory on the proxy card is to be transmitted to a magnetic stripe emulator on the proxy card at block 425. The data rate is calculated based on a predetermined multiple of the measured swipe speed in some embodiments. For example, the data rate can be calculated using equation (5) with N=2. At block 430, the processor transmits the set of magnetic stripe data at the calculated data rate to the magnetic stripe emulator to cause the magnetic stripe emulator to produce a changing magnetic field that emulates the set of magnetic stripe data stored in a memory on the proxy card as the proxy card is swiped through the magnetic card reader. At decision block 435, when the processor detects an end of the swipe based on the swipe speed measured by the swipe speed sensor (for e.g., when acceleration is 0) or based on a signal from a stop sensor, the processor stops transmitting the set of magnetic stripe data to the magnetic stripe emulator at block 440. That causes the magnetic stripe emulator to stop emulating the set of magnetic stripe data. If the end of the swipe has not been detected at decision block 425, the processor returns to block 420 to obtain a current value of the swipe speed and re-calculate the data rate based on that value.

Figure 5:
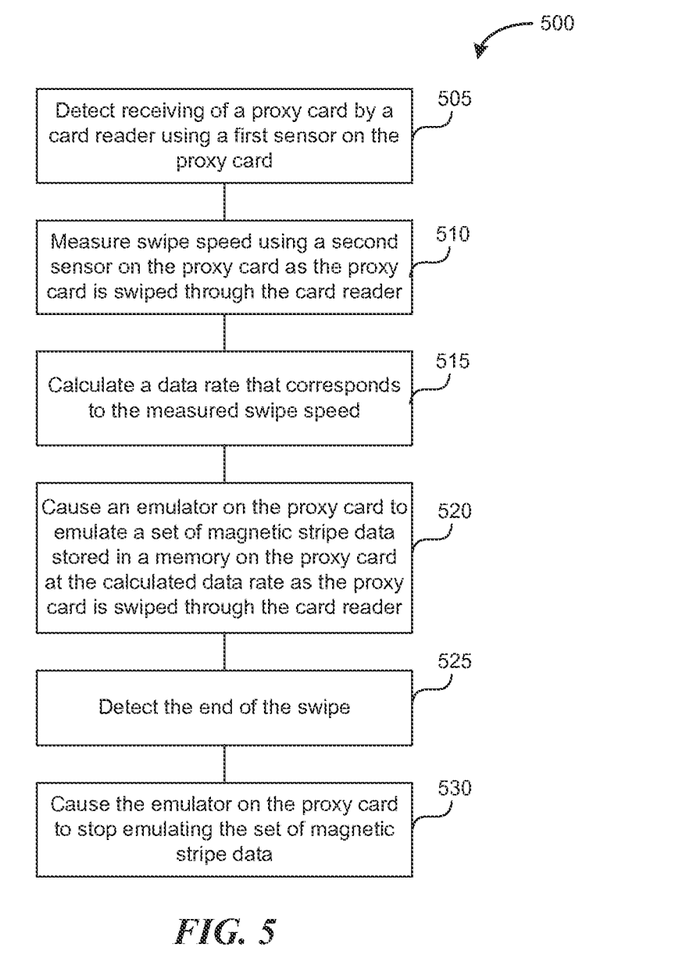
FIG. 5 is a logic flow diagram illustrating an example method for using a start of a swipe by a first sensor as a trigger to emulate magnetic stripe data at a data rate that corresponds to a swipe speed measured by a second sensor.

FIG. 5 is a logic flow diagram illustrating an example method 500 for using a start of a swipe by a first sensor to trigger emulation of magnetic stripe data at a rate that corresponds to the swipe speed measured by a second sensor. The method 500 starts with a first sensor on a proxy card detecting receiving of the proxy card by a magnetic card reader at block 505. A signal from the first sensor can trigger a second sensor to cause the second sensor on the proxy card to measure swipe speed of the proxy card at various points in time as the proxy card is swiped through the magnetic card reader at block 510. The signal from the first sensor also causes a processor on the proxy card to obtain the measured swipe speed of the proxy card and calculate a data rate using the measured swipe speed at block 515. For example, if the swipe speed is 20 ips and if the data density is 210 bpi (e.g., for emulating track 1 data), then the data rate is calculated as 20 ips×210 bpi or 4200 bps using equation (5).

At block 520, once the data rate is calculated, the processor transmits a set of magnetic stripe data stored in a memory on the proxy card at the calculated data rate to a magnetic stripe emulator to cause the magnetic stripe emulator to produce a changing magnetic field emulating the set of magnetic stripe data at the calculated data rate while the swipe is occurring. At block 525, the second sensor or a third sensor can detect the end of the swipe. At block 530, the processor obtains a signal from the sensor or third sensor indicating the end of the swipe and in response, stops transmitting data to the magnetic stripe emulator to cause the magnetic stripe emulator on the proxy card to stop emulating the set of the magnetic stripe data.

Figure 7:
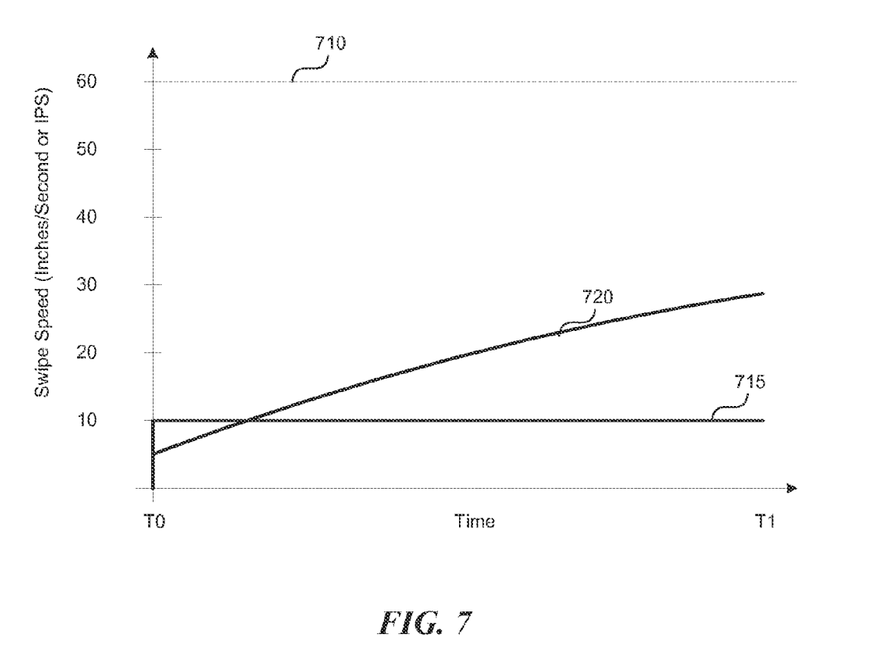
FIG. 7 illustrates swipe speed profiles over time from a start of a swipe to an end of the swipe through a magnetic card reader.

FIG. 7 illustrates swipe speed profiles over time from a start of a swipe to an end of the swipe through a magnetic card reader.

Typically, a magnetic card reader can decode swipe speeds within a range. Line 710 in the graphical diagram of FIG. 7 depicts a maximum swipe speed that can be decoded by the magnetic card reader. For swipe speeds higher than this maximum, decoding error is likely.

A speed at which a user swipes a magnetic stripe payment card is generally not constant throughout the entire duration of the swipe. An example profile 720 illustrates the variation of the swipe speed of the proxy card from the start of a swipe at time T0 to the end of the swipe at time T1. As illustrated, the example profile 720 increases gradually from an initial value (e.g., 0, when the proxy card is stationary at the start of the swipe) to a finite value. As the swipe speed of the proxy card varies over time, it is the instantaneous value of the swipe speed at a given time t that is used by a microcontroller to calculate a data rate for playing back magnetic stripe data.

In some embodiments, depending on the type of swipe speed sensor used, the swipe speed sensor outputs an average swipe speed. An example profile 715 illustrates the average swipe speed of the proxy card. The example profile 715 is depicted as being uniform throughout the swipe. This is usually the case when, for example, a sensor determines a swipe speed based on a length of electrode and a time taken to traverse through the length of the electrode.

Figure 8:
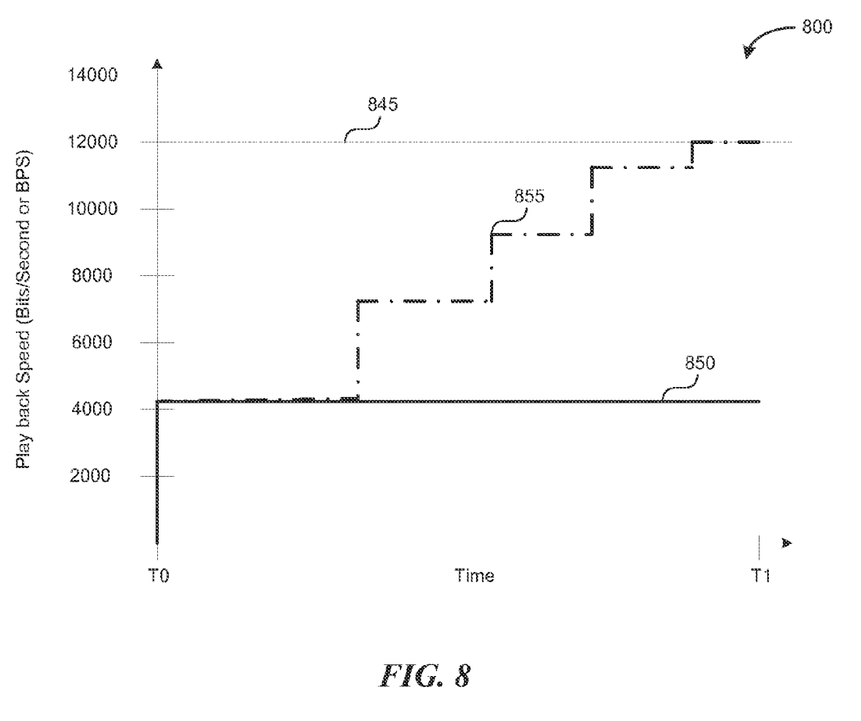
FIG. 8 illustrates play back speed profiles over time for the swipe speed profiles illustrated in FIG. 7.

FIG. 8 illustrates play back speed profiles over time for the swipe speed profiles illustrated in FIG. 7.

In FIG. 8, a data rate corresponding to the maximum swipe speed supported by the magnetic card reader is depicted as the upper threshold or ceiling 845 for the play back speed. If the play back speed exceeds this maximum threshold, a magnetic card reader is likely to encounter decoding error. Also depicted in FIG. 8 are example profiles 855 and 850. The example profile 855 illustrates an adjustment to the play back speed based on an instantaneous value of a swipe speed corresponding to the swipe speed profile 720 illustrated in FIG. 7. As the swipe speed changes over time, the play back speed is also adjusted to account for that change. Thus, at a given time, the play back speed can have a different value. The example profile 850, on the other hand, illustrates a play back speed that is mostly uniform. The play back speed in this case is adjusted once based on a value of the average swipe speed corresponding to the swipe speed profile 715 illustrated in FIG. 7.

What is claimed is:

1. A proxy payment card comprising:
   a substrate having:
   a memory storing magnetic stripe data associated with a payment card;
   a first sensor that detects a start of a swipe of the proxy payment card through a magnetic stripe reader;
   a second sensor that samples a speed at which the proxy payment card is swiped through the magnetic stripe reader and outputs a swipe speed, the second sensor being triggered into operation by a signal indicating the start of the swipe;
   a processor coupled to the memory and the first and second sensors, the processor being configured to:
   receive a signal from the first sensor indicating the start of the swipe;
   in response to receiving the signal,
   read magnetic stripe data from the memory, and
   generate electrical signals corresponding to the magnetic stripe data; and
   a magnetic stripe emulator connected to the processor and configured to:
   receive the electrical signals from the processor, and
   in response to receiving the electrical signals, generate a changing magnetic field readable by the magnetic stripe reader, the changing magnetic field encoding the magnetic stripe data for reading by the magnetic stripe reader during the swipe;
   the processor being further configured to:
   use the swipe speed output by the second sensor and the signal from the first sensor indicating the start of the swipe to iteratively adjust a rate at which the electrical signals are sent to the magnetic stripe emulator to cause the magnetic stripe emulator to adjust a rate of change of the magnetic field.

2. The proxy payment card of claim 1, wherein the second sensor is an accelerometer and wherein the swipe speed output by the second sensor is an instantaneous value of the swipe speed.

3. The proxy payment card of claim 2, wherein the first sensor is one of the accelerometer, a capacitive sensor or a light sensitive sensor.

4. The proxy payment card of claim 1, wherein the second sensor is a capacitive sensor and wherein the swipe speed output by the second sensor is an average value of the swipe speed.

5. The proxy payment card of claim 1, wherein the rate at which the electrical signals are sent to the magnetic stripe emulator is proportional to the swipe speed.

6. The proxy payment card of claim 1, wherein the first sensor is further configured to detect an end of the swipe of the proxy payment card through the magnetic stripe reader and in response send a signal to the processor to stop generating the electrical signals corresponding to the magnetic stripe data.

7. A method comprising:
measuring a swipe speed of a card a plurality of times during a swipe of the card through a magnetic stripe card reader; and
emulating magnetic stripe data by the card during the swipe, including iteratively adjusting, during the swipe of the card, a play back speed at which the magnetic stripe data is emulated by the card based on the swipe speed.

8. The method of claim 7, wherein the adjusting includes adjusting the play back speed to be proportional to a predetermined multiple of the swipe speed.

9. The method of claim 7 wherein the adjusting includes adjusting a data rate at which the magnetic stripe data is sent by a processor on the card to a magnetic stripe emulator on the card.

10. The method of claim 7, further comprising triggering the emulation of the magnetic stripe data when the card detects a start of the swipe of the card through the magnetic stripe card reader.

11. The method of claim 10, wherein the adjusting includes adjusting the play back speed to be proportional to twice the swipe speed.

12. The method of claim 11, wherein the adjusting includes determining the play back speed based on measurements from an accelerometer on the card, wherein the accelerometer also detects the start of the swipe of the card.

13. The method of claim 11, wherein the adjusting includes determining the play back speed based on measurements from an accelerometer on the card, and wherein a sensor that is separate from the accelerometer detects the start of the swipe of the card.

14. A reprogrammable data bearing card comprising:
a memory configured to store a set of magnetic stripe data;
a first sensor configured to measure swipe speed of the reprogrammable data bearing card a plurality of times during a swipe of the reprogrammable data bearing card through a magnetic read head; and
a processor configured to iteratively adjust a rate of transmission of the set of magnetic stripe data a plurality of times during the swipe of the reprogrammable data bearing card through the magnetic read head based on the swipe speed and to transmit the set of magnetic stripe data at the adjusted rate of transmission; and
a magnetic stripe emulator configured to receive the set of magnetic stripe data from the processor and to emulate the set of magnetic stripe data.

15. The reprogrammable data bearing card of claim 14, further comprising an input/output interface configured to receive a selection of the set of magnetic stripe data from a plurality of sets of magnetic stripe data stored in the memory.

16. The reprogrammable data bearing card of claim 14, wherein the processor adjusts the rate of transmission of the set of magnetic stripe data to be proportional to twice the swipe speed.

17. The reprogrammable data bearing card of claim 14, wherein the first sensor is one of an accelerometer, a capacitive sensor, a magnetic sensor or a light sensitive sensor.

18. The reprogrammable data bearing card of claim 14, further comprising a second sensor configured to detect a start of the swipe, wherein the set of magnetic stripe data is not emulated until the second sensor detects the start of the swipe.

* * * * *